United States Patent [19]
Lurie

[11] 4,035,055
[45] July 12, 1977

[54] COHERENT WAVE IMAGING AND/OR RECORDING TECHNIQUE FOR REDUCING THE GENERATION OF SPURIOUS COHERENT-WAVE IMAGE PATTERNS

[75] Inventor: Michael Jay Lurie, East Brunswick, N.J.

[73] Assignee: RCA Corporation, New York, N.Y.

[21] Appl. No.: 600,507

[22] Filed: July 30, 1975

[51] Int. Cl.² .................... G03H 1/16; G02B 27/38
[52] U.S. Cl. ........................... 350/3.5; 350/162 SF
[58] Field of Search ...................... 350/3.5, 162 SF

[56] References Cited
U.S. PATENT DOCUMENTS

| | | | |
|---|---|---|---|
| 3,620,598 | 11/1971 | Brandt | 350/162 SF |
| 3,689,129 | 9/1972 | Lurie | 350/3.5 |
| 3,749,469 | 7/1973 | Gayeski | 350/3.5 |
| 3,837,725 | 9/1974 | Bricot et al. | 350/3.5 |

OTHER PUBLICATIONS

Stroke et al, *Physics Letters*, vol. 15, No. 3, Apr. 1965, pp. 238–240.

*Primary Examiner*—Ronald J. Stern
*Attorney, Agent, or Firm*—H. Christoffersen; Samuel Cohen; George J. Seligsohn

[57] ABSTRACT

A mask is used to sequentially illuminate successive elemental areas of an object (by changing the position of the mask) to obtain from each relatively small elemental area a diverging object-information component of coherent wave energy which is passed through a relatively large cross-sectional aperture of imaging and/or recording means. The fact that this cross-sectional aperture is so much larger in area than the area covered by any dust or optical defects of the imaging and/or recording means markedly reduces spurious coherent-wave patterns normally produced by such dust or optical defects. Further, since the illumination is not diffuse, no speckle pattern problem exists.

8 Claims, 7 Drawing Figures

COHERENT WAVE IMAGING AND/OR RECORDING TECHNIQUE FOR REDUCING THE GENERATION OF SPURIOUS COHERENT-WAVE IMAGE PATTERNS

This invention relates to a system for forming an image (and, if desired, recording that image) of an object illuminated with coherent wave energy and, more particularly, to such a system which significantly reduces the blemishes to which prior art imaging and recording systems using coherent light were subject.

Images formed by holography, or any other type of imaging system using coherent light, are plagued by blemishes. These blemishes are due mainly to dust, dirt and small defects on surfaces of optical elements in the system. Blemishes in such images may be reduced if the light from each object point is made to pass through a relatively large area of each surface and element in the imaging system, thereby reducing the relative effect of any small defect. Although this is often accomplished by diffusing the light from the object, diffused coherent light produces speckling in images which becomes more severe as the required performance of the optical system approaches the diffraction limit. In particular, speckle prevents the efficient use of diffuse illumination with small holograms or other small aperture systems.

Briefly, in accordance with the principle of the present invention, means including masking means are used for sequentially imaging and/or recording object information of separate elemental regions of an object on a medium with coherent wave energy from each respective separate region of the object. Further, the coherent-wave system of the present invention includes imaging and/or recording means having a given aperture, and the means including the masking means causes the coherent wave energy from each respective separate relatively small elemental region of the object to diverge so that it is passed through a relatively large portion of the given aperture of the imaging and/or recording means during each of the sequential imagings and/or recordings. In this manner, image blemishes are substantially avoided without the occurrence of speckle.

This and other features and advantages of the present invention will become more apparent from the following detailed description taken together with the accompanying drawings, in which.

Figure 1:
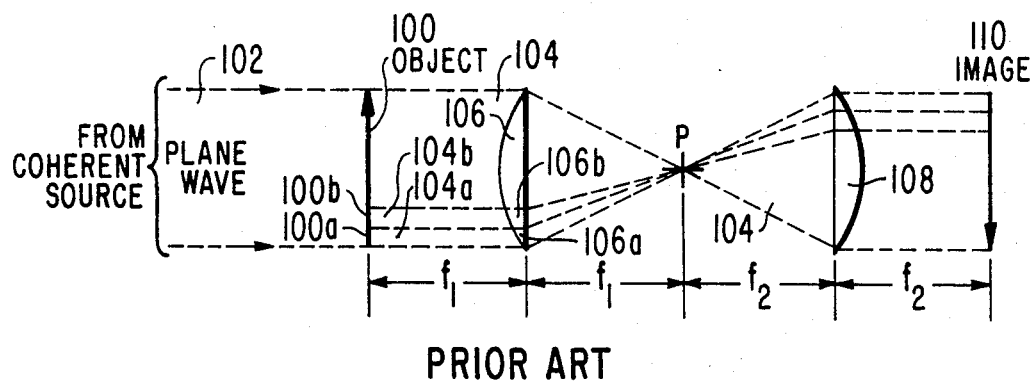
FIG. 1 is a schematic diagram illustrating the principles of one example of prior art coherent wave imaging and/or recording systems which make them subject to a high degree of coherent-wave blemishes.

Referring now to FIG. 1, in a typical example of a prior art coherent-wave imaging of object-information, object 100, which may be a transparency, is illuminated by a coherent wave of light from a coherent source, such as plane wave 102. The object-information beam 104 can be considered to be composed of a plurality of contiguous portions, such as 104a and 104b, arising from corresponding contiguous regions of object 100, such as 100a and 100b.

Object 100 lies in the front focal plane of first lens 106, which has a first focal length $f_1$. Lens 106 focuses object-information beam 104 at focal point P in the back focal plane of lens 106. What is material, from the point of view of the present invention, is that each component portion of object-information beam 104, such as component portions 104a and 104b, is incident on a relatively small separate corresponding portion of lens 106, such as lens portions 106a and 106b.

A second lens 108, having a second focal length $f_2$, is situated with its front focal plane in coincidence with the back focal plane of lens 106. Lens 108 derives an image 110 of object 100 in its back focal plane, as shown in FIG. 1. In practice, image 110 is normally produced on a recording medium, screen or wave energy sensing means situated in the back focal plane of 108. Again, what is material, from the point of view of the present invention, is that each component portion of object beam 104 is incident on a relatively small separate corresponding portion of lens 108.

If lenses 106 and 108 were perfectly clean and possessed absolutely no optical defects, the use of coherent wave energy would create no problem. However, in practice, a certain amount of dust is always present on lenses 106 and 108, and these lenses do possess some optical defects. While the relative area of a lens covered by dust or optical defects may be tiny with respect to the overall area of the lens, still, any single area of the lens on which dust or an optical defect is present is relatively large compared to the cross-section of an object component portion, such as 104a or 104b, of object-information beam 104 incident thereon. The interaction of dust or optical defects on lens 106 or 108 with the object-information component portion of beam 104 incident thereon causes a scattering of the coherent wave energy which, due to interference, results in undesired spurious patterns appearing in image 110. The present invention minimizes the generation of such unwanted spurious patterns appearing in the image.

Figure 2:
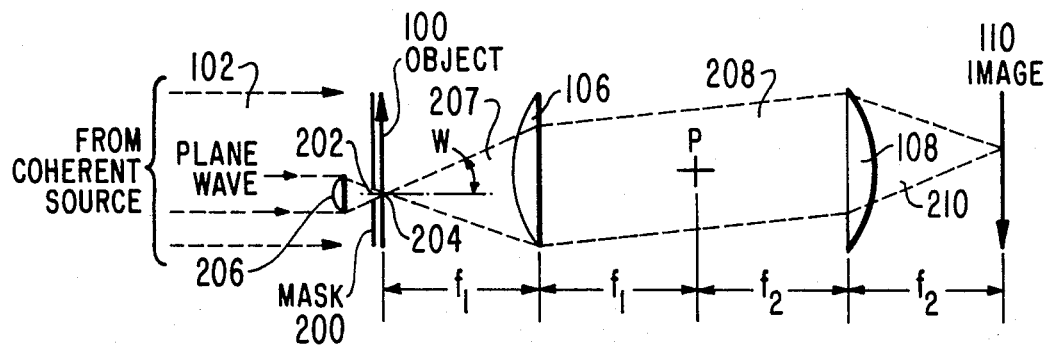
FIG. 2 is a schematic diagram of a modification of the prior art system of FIG. 1 which illustrates the principles of the present invention.

Referring now to FIG. 2, a mask 200 is placed immediately in front of object 100. Mask 200 is opaque to incident wave energy for a single transparent portion 202 thereof, which may consist of a round hole, a slit, or a transparent region having any other desired shape. Mask 200 absorbs most of the coherent wave energy in plane wave 102, permitting only the coherent wave energy incident at transparent portion 202 to impinge on a selected elemental area 204 of object 100. Further, a condensing lens 206 may be placed in front of transparent portion 202 for the purpose of both concentrating the wave energy which impinges on selected elemental area 204 of object 100 and deriving an object-information beam 207 which diverges with a half angle W. Since transparent portion 202 is normally a pinhole or a slit sufficiently small to derive diverging objectinformation beam 207 by diffraction, condensing lens 206 is not normally necessary to obtain a diverging object-information beam but only to concentrate the wave energy on selected elemental area 204.

In any case, diverging object-information beam 207, which contains object-information concerning only selected elemental area 204, is incident on a large portion (or even all) of lens 106. Lens 106 transforms diverging object-information beam 207 into parallel object-information beam 208, which is incident on a similar large portion of lens 108, as shown in FIG. 2. Lens 108 transforms parallel object-information beam 208 into converging object-information beam 210, which focuses an image in the back focal plane of lens 108 of the selected elemental area 204 of object 100 sampled by the transparent portion 202 of mask 200. If each elemental area, such as elemental area 204, of object 100 is sequentially selected in turn by either moving mask 200, thereby moving transparent portion 202, only between successive fixed-position exposures, or by continuously scanning mask 200, an image 110 of the entire object 100 may be sequentially constructed. Since the construction of image 110 is accomplished in this sequential manner, it is necessary in the embodiment shown in FIG. 1 that image 110 be produced on a recording medium situated in the back focal plane of 108, or, in the alternative, that the speed of the sequential imaging of the entire object 100 and/or the persistence of a screen or light sensing element in the back focal plane of lens 108 be sufficient to sequentially derive an entire image 110. From the point of view of the present invention, however, an important feature of the sequential imaging arrangement shown in FIG. 2, compared to the prior art simultaneous imaging system shown in FIG. 1, is that the portion of both lens 106 and lens 108 illuminated by object-information wave energy from each sequentially selected elemental area, such as area 204, of object 100 is much larger in area than the size of any selected elemental area. This is not true in the prior art arrangement of FIG. 1, where object-information wave energy from each elemental area illuminates only a small portion of lens 106 and 108. Therefore, in the arrangement of FIG. 2, the deleterious effect on coherent wave energy produced by any small amount of dust or optical defect which may exist on any part of lenses 106 and 108 is greatly diminished because of the relatively large area of lenses 106 and 108 (compared to the area of lenses 106 and 108 occupied by dust or optical defects) over which the object-information beam from each selected elemental area 204 of object 100 is spread. Another important feature is that continuous scanning can take place without destroying the coherence of the light, allowing coherent imaging and holography even with a moving mask.

Figure 3:
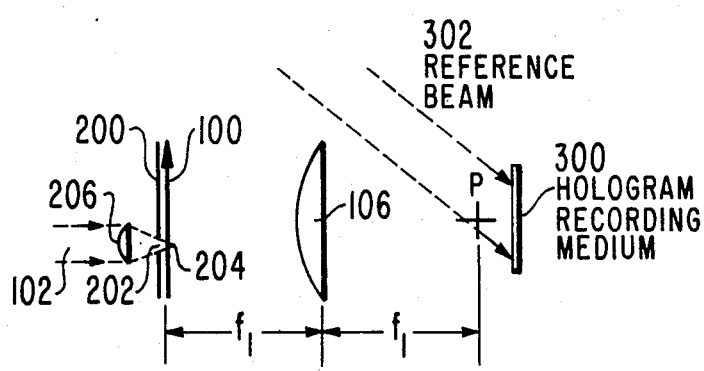
FIG. 3 is a schematic diagram illustrating a modification of the arrangement of FIG. 2 for recording a Fraunhofer hologram.

FIG. 3 shows a modification of the arrangement of FIG. 2 for recording a Fraunhofer hologram. In particular, FIG. 3 shows all the elements employed in the left-hand portion of FIG. 2, i.e. plane-wave coherent wave energy 102, condensing lens 206, mask 200 having a transparent portion 202, object 100 having elemental area 204 and first lens 106. In addition, FIG. 3 includes a hologram recording medium 300, situated as shown, slightly to the right of focal point P. Therefore, hologram recording medium 300 is illuminated by a parallel object-information beam, similar to object-information beam 208 (not specifically shown in FIG. 3). In addition, for the purpose of recording a hologram, hologram recording medium 300 is illuminated with reference beam 302 of coherent wave energy, which as known in the art, interferes with the object-information beam simultaneously illuminating hologram recording medium 300. In all other respects, the operation of the arrangement of FIG. 3 is identical to the operation of the arrangement shown in FIG. 2. Therefore, mask 200, along with the transparent portion 202, can be sequentially moved to successively sample all of the various elemental areas of object 100. In this manner, holograms of each of the selected elemental areas of object 100 are successively recorded on hologram recording medium 300.

Figure 4:
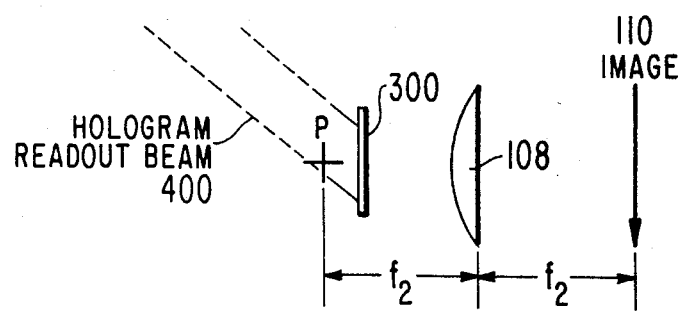
FIG. 4 is a schematic diagram illustrating a system for reading out the Fraunhofer hologram recorded by the arrangement shown in FIG. 3.

A Fraunhofer hologram, recorded by the arrangement of FIG. 3, may be read out by the arrangement of FIG. 4. Specifically, the arrangement of FIG. 4, includes the right-hand portion of the arrangement shown in FIG. 2, i.e. lens 108 for producing image 110. In addition, FIG. 4 includes hologram recording medium 300, which is illuminated with hologram read out beam 400 of coherent wave energy. As is known in the art, if hologram read out beam 400 has the same wavelength as reference beam 302 and is inclined at the same angle with respect to hologram recording medium 300 as reference beam 302, hologram recording medium 300 simultaneously reconstructs each of the parallel object-information beams 208 corresponding to each of the sequentially recorded elemental areas of object 100, and lens 108 derives in its back focal plane an image 110 corresponding to the entire object 100. Normally, the image of a reconstructed Fraunhofer hologram includes unwanted spurious coherent wave energy patterns, which are particularly conspicuous when the size of the recorded hologram is relatively small. However, these unwanted spurious coherent-wave patterns are substantially reduced or eliminated when the Fraunhofer hologram arrangements of FIGS. 3 and 4 are employed.

Figure 5:
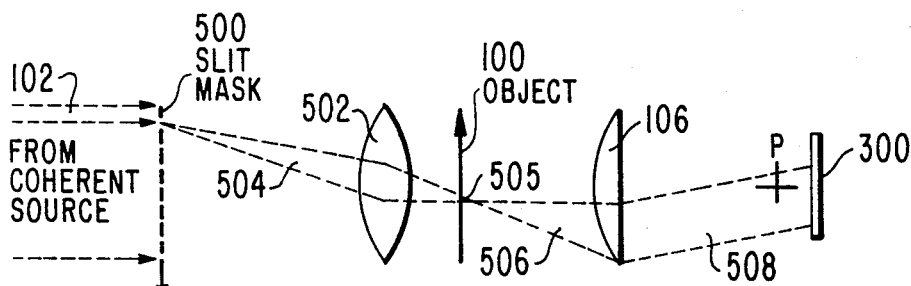
FIG. 5 is a schematic diagram of another embodiment of the present invention incorporating a slit mask for recording the object-information beam of a Fraunhofer hologram.

The sequential recording systems shown in each of FIGS. 2 and 3, each of which employs only a single transparent portion 202 in mask 200, are very effective in minimizing unwanted spurious coherent-wave patterns in the image. However, they are relatively slow, due to the large number of individual selected elemental areas into which object 100 must be divided. In FIG. 5, a mask 500 is used which incorporates a plurality of parallel slits. The width of each slit of slit mask 500 is small compared to the distance between adjacent slits. Each of the slits derives an individual coherent-wave beam 504 from incident plane wave 102. Lens 502 simultaneously focuses the coherent-wave beams 504 from all of the slits of slit mask 500 on separate, spaced elemental areas, such as elemental area 505 of object 100. Or, the mask 500 could be placed immediately before the object, as a mask 200 in FIG. 2. Each of elemental areas 505 of object 100 gives rise to a different diverging object-beam component 506 which is incident on a certain portion of lens 106. While the area of the portion of lens 106 illuminated by any one of the diverging object-information beam components in FIG. 5 is smaller than FIGS. 2 and 3, due to interference effects, it is still larger than in the prior art arrangement of FIG. 1. Lens 106 simultaneously transforms each of diverging object-beam components 506, corresponding to separate spaced elemental areas of object 100, into parallel object-beam components 508. Reference beam 302 has not been shown in FIG. 5, although it could be added in order to record a hologram.

The arrangement shown in FIG. 5 is operated in any one of several different ways in recording a hologram. In a first of these ways, a sub-hologram is recorded with the slits of slit mask 500 in a first fixed position. Then slit mask 500 is moved so that a different set of selected elemental areas, such as area 505, of object 100 is illuminated, with each of the new illuminated elemental areas just touching the old. At the same time, recording medium 300 may be moved so that a different area thereof is now in a position to be exposed. Then a second sub-hologram is made. This process is repeated until the entire area of object 100 has been illuminated once. Great care is required to prevent overlap of successively exposed illuminated elemental areas of object 100, which would produce unwanted bright lines, or gaps between such successively illuminated elemental areas, which would produce unwanted black lines. A second way of operating the arrangement shown in FIG. 5, is to continuously move slit mask 500 at a uniform speed across object 100 and employ a sequentially-operated shutter at the coherent source to intermittently produce plane wave 102. In this case, a first subhologram is exposed, then the shutter is closed just long enough for the slits to scan one slit width, and during that time recording medium 300 is moved. The shutter is then opened for the next sub-hologram exposure. The process is repeated until the entire object has been illuminated once.

Figure 6A:
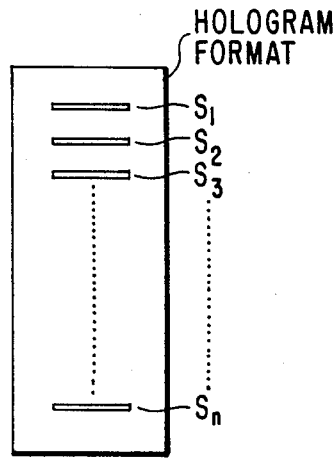
FIG. 6a and FIG. 6b show alternative hologram formats which may be recorded by the arrangement of FIG. 5.
Figure 6B:
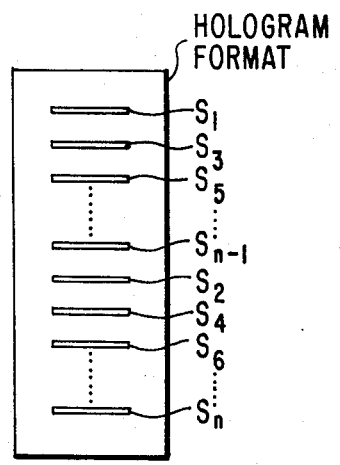

In either of the two ways of operating the arrangement in FIG. 5, described above, the hologram format produced is like that shown in FIG. 6a. Although the sub-holograms $S_1$ through $S_n$ are shown distinct, they will generally spread and partially overlap due to diffraction. In the reconstruction of such a hologram format, some extraneous pattern is produced by interference between the light at adjacent edges of successive sub-holograms. Because successive sub-holograms are loacted near each other on the hologram recording, the resulting interference is of low spatial frequency and very visible. This may be eliminated by increasing the spacing between successively recorded holograms, by moving the recording medium a greater distance between successive exposures. However, this wastes space on the recording medium. To avoid this waste of space, the hologram format shown in FIG. 6b may be employed, in which sub-holograms are interlaced, which produces no visible beats. This interlacing is accomplished with either of the two ways of operating the arrangement shown in FIG. 5, described above, by moving slit mask 500 between successive exposures by a sufficient amount so that only sub-holograms of the odd elemental areas of object 100 are recorded during a first series of exposures, in which recording medium 300 is moved by a relatively large amount during successive exposures, followed by a second series of exposures during which sub-holograms of the even elemental areas of object 100 are recorded in the space between two successive sub-holograms in the first series.

Slit mask 500 in FIG. 5 may be moved continuously, without any interruption of the illumination 102 with a shutter. As pointed out previously, this does not alter the coherence of illumination 102. It is an important feature of this invention, therefore, that a hologram can be recorded (with the addition of reference beam 302) while the mask 500 is continuously moving. As is known in conventional optics, lens 502, or other systems, can be arranged so that moving the mask 500 causes a corresponding motion of the illuminated portion of recording material 300, thereby producing a hologram format similar to FIG. 6a, but with sub-hologram $S_1$ through $S_n$ continuously merging into one another.

By way of example, in a specific embodiment of the arrangement shown in FIG. 5 which was actually constructed, object 100 was 10 mm × 7.5 mm, the slits were 140 micrometers wide with 300 micrometer center-to-center spacing, reduced by lens 502 to produce elemental areas 505 of 30 micrometers wide with 180 micrometers center-to-center spacing, and lens 106 had a 50 mm focal length. The holograms made by the arrangement of FIG. 5 were reconstructed conventionally, as in FIG. 4. further, although Fraunhofer holograms have been specifically disclosed herein, the principles of the present invention may be used with the recording of other types of holograms, such as Fresnel holograms.

What is claimed is:

1. In a coherent-wave imaging and/or recording system including means for imaging and/or recording object-information from an object illuminated with coherent-wave energy, the improvement therein for reducing spurious coherent wave image patterns due to blemishes in said means for imaging and/or recording object information, said improvement comprising:
an optical system including masking means for sequentially imaging and/or recording object information of relatively small separate elemental regions of said object with divergent coherent wave energy from each respective separate region of said object, said coherent wave energy from each respective separate region being passed during each of said sequential imagings and/or recordings through a relatively large portion of the aperture of said imaging and/or recording means with respect to the size of an elemental region of said object.

2. The system defined in claim 1, wherein said masking means includes a mask having at least one transparent portion in a selected proximate position with respect to said object to permit illumination with coherent wave energy of only a selected elemental area of said object determined by said selected proximate position, and means for illuminating said selected elemental area through said transparent portion of said mask during each of said sequential imagings and/or recordings with a beam of said coherent wave energy which thereafter diverges to fill said portion of said imaging and/or recording means, said selected position being different between successive ones of said sequential imagings and/or recordings.

3. The system defined in claim 2, wherein said imaging and/or recording means comprises a Fourier-transform lens.

4. The system defined in claim 3, and including a recording medium, and further including means for illuminating said recording medium with a hologram reference beam of coherent wave energy during each of said sequential imagings on said medium to thereby record a Fraunhofer hologram on said recording medium.

5. The system defined in claim 2, wherein said transparent portion of said mask is moved from one selected position to another selected position only between successive ones of said sequential imagings and/or recordings and remains stationary during the occurrence of each sequential imaging and/or recording.

6. The system defined in claim 2, wherein said transparent portion of said mask is continuously scanned over the elemental areas of said object while said imagings and/or recordings of said elemental areas are occurring.

7. The system defined in claim 2, wherein said means for illuminating said selected elemental area includes lens means for focusing coherent wave energy on said selected elemental area.

8. The system defined in claim 2, wherein said mask includes a plurality of substantially parallel transparent slits each having a given width, adjacent ones of said slits being separated by a given distance.

* * * * *